United States Patent [19]
Frank et al.

[11] Patent Number: 5,107,251
[45] Date of Patent: Apr. 21, 1992

[54] METHOD AND APPARATUS FOR DETECTING CURSORS

[75] Inventors: Edward H. Frank, Portola Valley; Thomas Westberg, Mountain View, both of Calif.

[73] Assignee: Sun Microsystems, Inc., Mountain View, Calif.

[21] Appl. No.: 398,612

[22] Filed: Aug. 25, 1989

[51] Int. Cl.⁵ .............................................. G09G 3/02
[52] U.S. Cl. ................... 340/709; 340/706; 340/724; 340/799
[58] Field of Search ............... 340/706, 709, 799, 710, 340/723, 724; 364/518, 521

[56] References Cited

U.S. PATENT DOCUMENTS

| | | | |
|---|---|---|---|
| 4,405,830 | 9/1983 | Foster et al. | 340/709 X |
| 4,625,202 | 11/1986 | Richmond et al. | 340/709 |
| 4,668,947 | 5/1987 | Clarke, Jr. et al. | 340/709 |
| 4,734,689 | 3/1988 | Kurakake | 340/709 X |

FOREIGN PATENT DOCUMENTS 0201432 10/1985 Japan ................................... 340/709

OTHER PUBLICATIONS

I. D. Judd et al., "Microprocessor-Controlled Cursors," IBM Technical Disclosure Bulletin, vol. 22, No. 5, Oct. 1979, pp. 2103-2105.

*Primary Examiner*—Ulysses Weldon
*Attorney, Agent, or Firm*—Blakely Sokoloff Taylor & Zafman

[57] ABSTRACT

Apparatus and methods are disclosed which are most advantageously used with a digital computer for detecting the location of multiple cursors in a computer memory having parity bits. In one embodiment of the present invention, the normal parity checking scheme of the computer memory is modified, such that the parity bit is used to detect data locations containing cursor data. Writing new data to the frame buffer is implemented as a read-modified-write cycle. In another embodiment of the present invention, the parity checking of the computer memory is no longer used as such. Instead, the memory controller has a mode that forces the parity bit to one of two states, independent of the contents of the data location. Rather than writing to the frame buffer as a read-modify-write cycle, the memory controller detects the location of the cursor by reading the state of the parity bit while writing the contents of the data location associated with the parity bit. As a result of implementing the present invention, the CPU spends less time manipulating the cursors while maintaining a high frame buffer access bandwidth.

44 Claims, 6 Drawing Sheets

FIG 6 though not necessarily, these quantities take the form of electrical or magnetic signals capable of being stored, transferred, combined, compared, and otherwise manipulated. It

METHOD AND APPARATUS FOR DETECTING CURSORS

BACKGROUND OF THE INVENTION

1. Field of the Invention

The present invention relates to an apparatus and methods for displaying graphic information. More particularly, the present invention relates to a data processing apparatus and methods for detecting cursors in a computer memory having parity bits.

2. Art Background

Many computer display systems employ a frame buffer coupled between the central processing unit (CPU) and the display. A frame buffer is a memory into which the CPU writes data to be displayed. Each pixel on the display screen is represented by at least one memory location in the frame buffer, forming a bitmap of the actual screen. The contents of each memory location in the frame buffer is scanned and displayed on the screen before it is refreshed by new image data.

Once graphic images are generated on the screen, it is convenient for users to interact with, or modify, the images by pointing at them. A cursor is an on-screen position indicator controlled by a class of control devices such as a mouse, trackball, lightpen, touchscreen, and the like. A standard problem in designing frame buffers that drive graphic display systems is to disassociate the rendering of the cursor with that of the rendering of graphic images. The ultimate goal is to reduce the CPU time needed to manipulate the cursor, while maintaining the cost of additional hardware and/or software at a minimum.

One prior art approach is to have two separate frame buffers, one for the rendering of graphic images, the other for displaying the cursor. The cursor frame buffer may be the same size as, or smaller than, the display screen. While this solution requires no special hardware, the disadvantage is the cost of a separate memory plane.

Another technique is to force the software to check whether the cursor lies within a predetermined area before rendering graphic images. The area is defined by a bounding box. The disadvantage of this technique is that the repeated checking, regardless of whether the cursor lies within the bounding box, consumes a lot of CPU time, and hence adversely affects the overall performance of the graphic display system.

A variation of the preceding technique is to incorporate base-bounds registers as part of the frame buffer interface. The base register contains the lowest memory address of the cursor data, and the bounds register contains the highest address. When any reference is made to the location between the memory addresses of the base-bounds register, the frame buffer interface generates an interrupt to alert the CPU that it is about to overwrite the cursor data with the original image data. Image manipulation will follow before the cursor data is restored and the interrupt is disabled. Although it requires less CPU time to manipulate the cursor than the preceding software technique, the cursor interrupts reduce the frame buffer access bandwidth—the rate at which the frame buffer can be updated.

As will be described more fully below, the present invention provides methods and an apparatus for detecting multiple cursors in a frame buffer formed as part of the main computer memory. The present invention incorporates a modest amount of hardware in order to substantially reduce the CPU time needed to manipulate multiple cursors. The overall performance of graphic display systems using the present invention is improved because the manipulation of cursors can be carried out while maintaining a high frame buffer access bandwidth.

SUMMARY OF THE INVENTION

Apparatus and methods are disclosed which are most advantageously used with a digital computer for detecting the location of multiple cursors in a computer memory having parity bits.

In one embodiment of the present invention, the normal parity checking scheme of the computer memory is modified, such that the parity bit is used to detect data locations containing cursor data. Writing new data to the frame buffer is implemented as a read-modified-write cycle.

In another embodiment of the present invention, the parity checking of the computer memory is no longer used as such. Instead, the memory controller has a mode that forces the parity bit to one of two states, independent of the contents of the data location. Rather than writing to the frame buffer as a read-modified-write cycle, the memory controller detects the location of the cursor by reading the state of the parity bit while writing the contents of the data location associated with the parity bit.

As a result of implementing the present invention, the CPU spends less time manipulating the cursors while maintaining a high frame buffer access bandwidth.

NOTATION AND NONMENCLATURE

The detailed description that follows is presented largely in terms of algorithms and symbolic representations of operations on data bits and data structures within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally or reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE INVENTION

An apparatus and methods for detecting cursors in a frame buffer formed as part of a computer memory having parity bits for pixel based graphic display system is disclosed. In the following description, for purposes of explanation, specific devices, signals, and data structures are disclosed in order to more thoroughly understand the present invention. However, it will be apparent to one skilled in the art that the present invention may be practiced without these specific details. In other instances, well known circuits, devices, and data structures are not disclosed herein to avoid obscuring the present invention unnecessarily.

Figure 1:
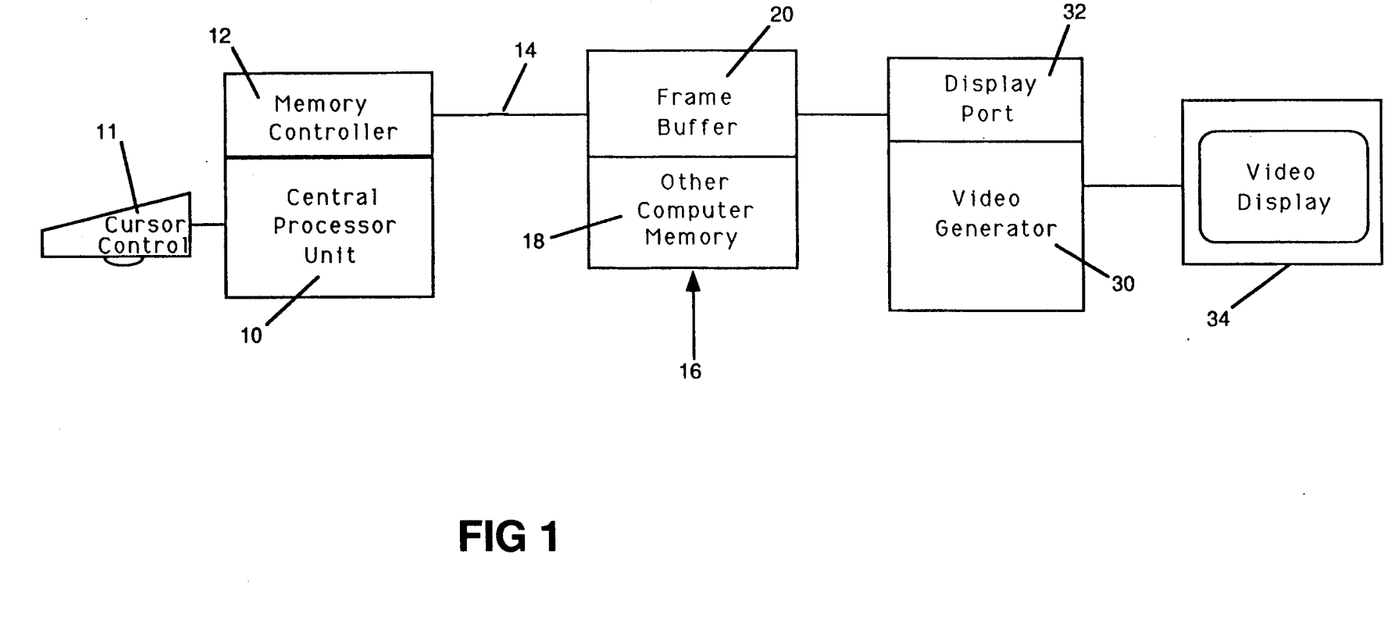
FIG. 1 is a block diagram illustrating the structure of a general graphic display system incorporating a frame buffer formed as part of the main computer memory.

Referring to FIG. 1, a central processing unit (CPU) 10 is coupled to a frame buffer 20 over a system bus 14. A cursor control device 11 is coupled to the CPU 10 for providing signals in generating cursor position. Image data and cursor data are written by a memory controller 12, which is also coupled to the CPU 10, into the frame buffer 20. The frame buffer 20 is incorporated as part of a man computer memory 16.

Display port 32 reads image data and cursor data from the frame buffer 20 and displays the data on a video display screen 34. As shown in the figure, in general, display port 32 reads data from frame buffer 20 at a faster rate than memory controller 12 writes data into frame buffer 20.

Figure 2:
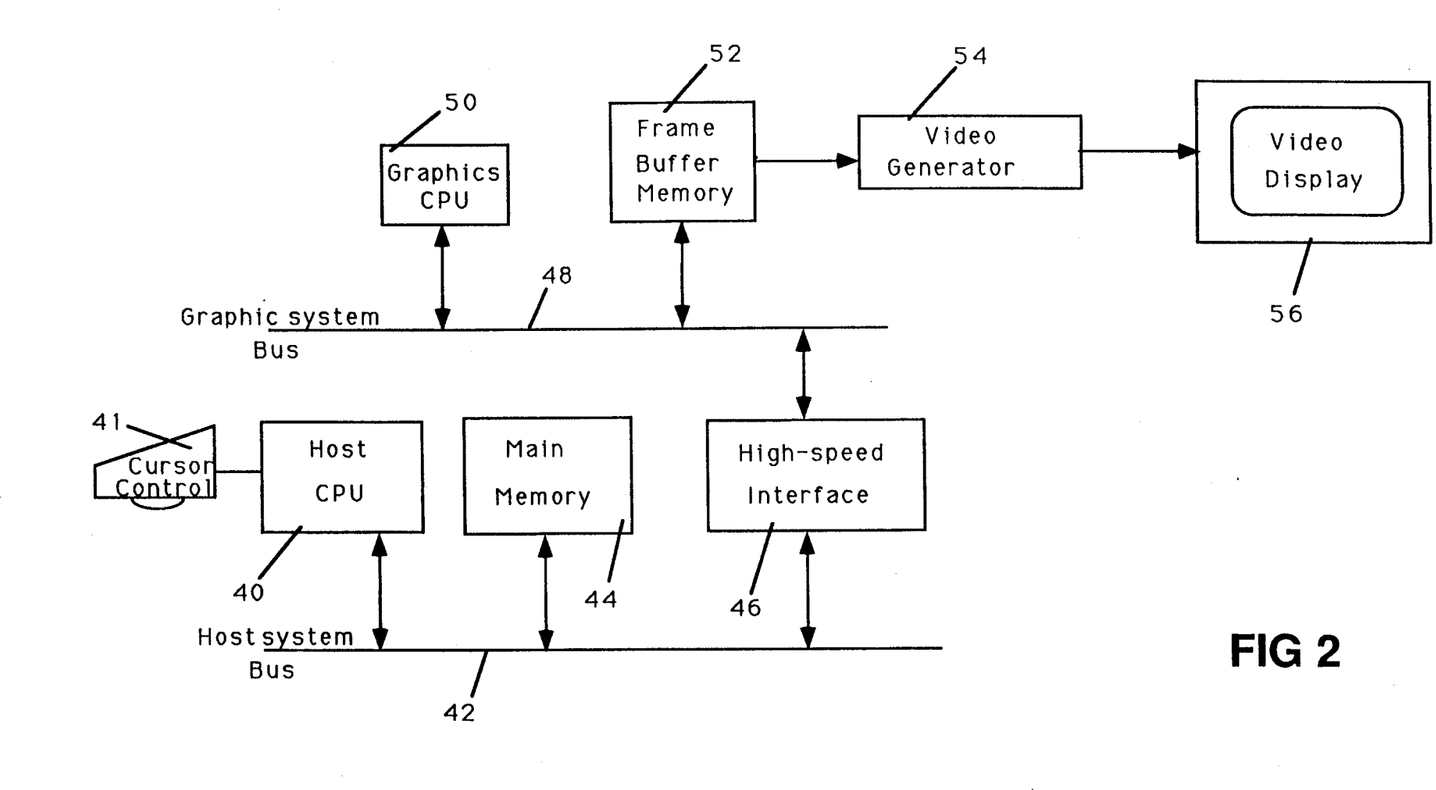
FIG. 2 is a block diagram illustrating the structure of a general graphic display system incorporating at least one separate frame buffer.

FIG. 2 illustrates a dual system bus graphic display system incorporating the present invention. It will be appreciated that although the present invention has been described with reference to a frame buffer as part of the main computer memory illustrated in FIG. 1, nothing will preclude one skilled in the art to practice the same invention in a configuration shown in FIG. 2, or other memory configuration having a parity bit checking scheme. In FIG. 2, a host CPU 40 is coupled to a main memory 44 over a host system bus 42. A cursor control device 41 is coupled to the host CPU 40. Cursor data is transmitted from the host CPU 40 and written into a frame buffer memory 52 by a high-speed interface 46. A graphic CPU 50 generates image data, and writes the data into the frame buffer memory 52 over a graphic system bus 48. A video generator 54 reads image data and cursor data from the frame buffer memory 52, and displays it on video display 56.

Figure 3A:
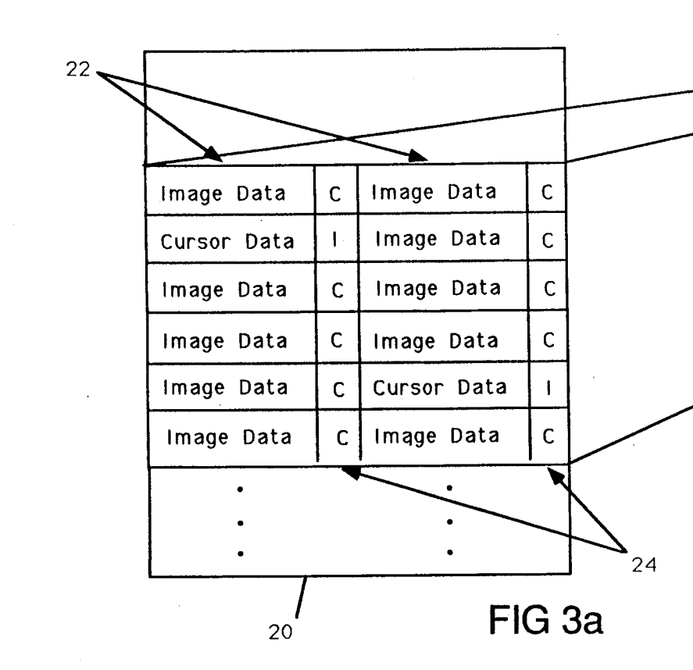
FIGS. 3a and 3b illustrate the data structure of a frame buffer in accordance with the present invention.
Figure 3B:
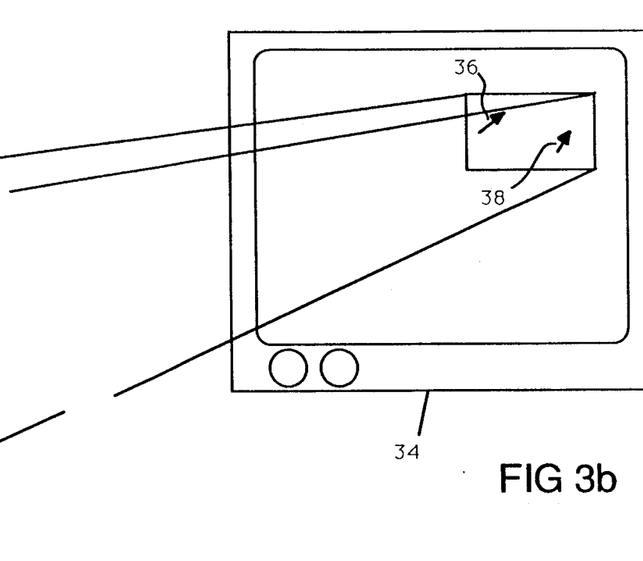

As shown in FIGS. 3a and 3b, two cursors 36 and 38 are displayed simultaneously on the video display screen 34. The displayed screen including the two cursors has a corresponding "bitmap" in frame buffer 20. Referring again to FIGS. 3a and 3b, a selected region of the screen encompasses the two cursors 36 and 38. The corresponding bitmap in frame buffer 20 of the same region is also illustrated in FIG. 3. Like the main computer memory 16, each memory location of frame buffer 20 has a data location 22 and a parity bit 24.

In most computer systems, data locations of the main computer memory may be used for storing data except for the portion which is used to store the parity bits. The parity bit has historically been used for error detection and data correction. To provide a built-in accuracy check on each new data written into the memory, the CPU counts the number of 1s in each data location before it is written. The memory controller writes either a 1 or 0 in the parity bit location, such that the total number of 1s or 0s in each parity bit is always an odd number (odd-bit parity) or an even number (even-bit parity). The parity bit is read and checked every time data is read from the data location. If the parity check is incorrect, this means that the data location has been improperly written and the system will generate an error interrupt and rewrite the data location.

Referring once again to FIGS. 3a and 3b data location 22 contains either image data or cursor data for each pixel on the video display screen 34. However, in the present invention the parity bit 24 will not be used for error detection. Instead, the parity bit will be used to indicate whether or not each data location 22 contains cursor data. A data location 22 containing image data will be written with a "correct" parity bit (parity bit set to "C"), while a data location containing cursor data will be written with an "incorrect" parity (parity bit set "I"). Accordingly, the parity bit is used to track the position of the cursor on the video display screen. The present invention is based on the premise that error detection for the frame buffer is usually not required, since single pixel errors do not present a visual problem on display, and, in any event, such errors occur very infrequently. Even if an actual parity error occurs, it is likely to be corrected the next time the CPU updates the display. Thus, the dedication of the parity bit to cursor tracking, and not to error detection, does not degrade system performance.

Figure 4:
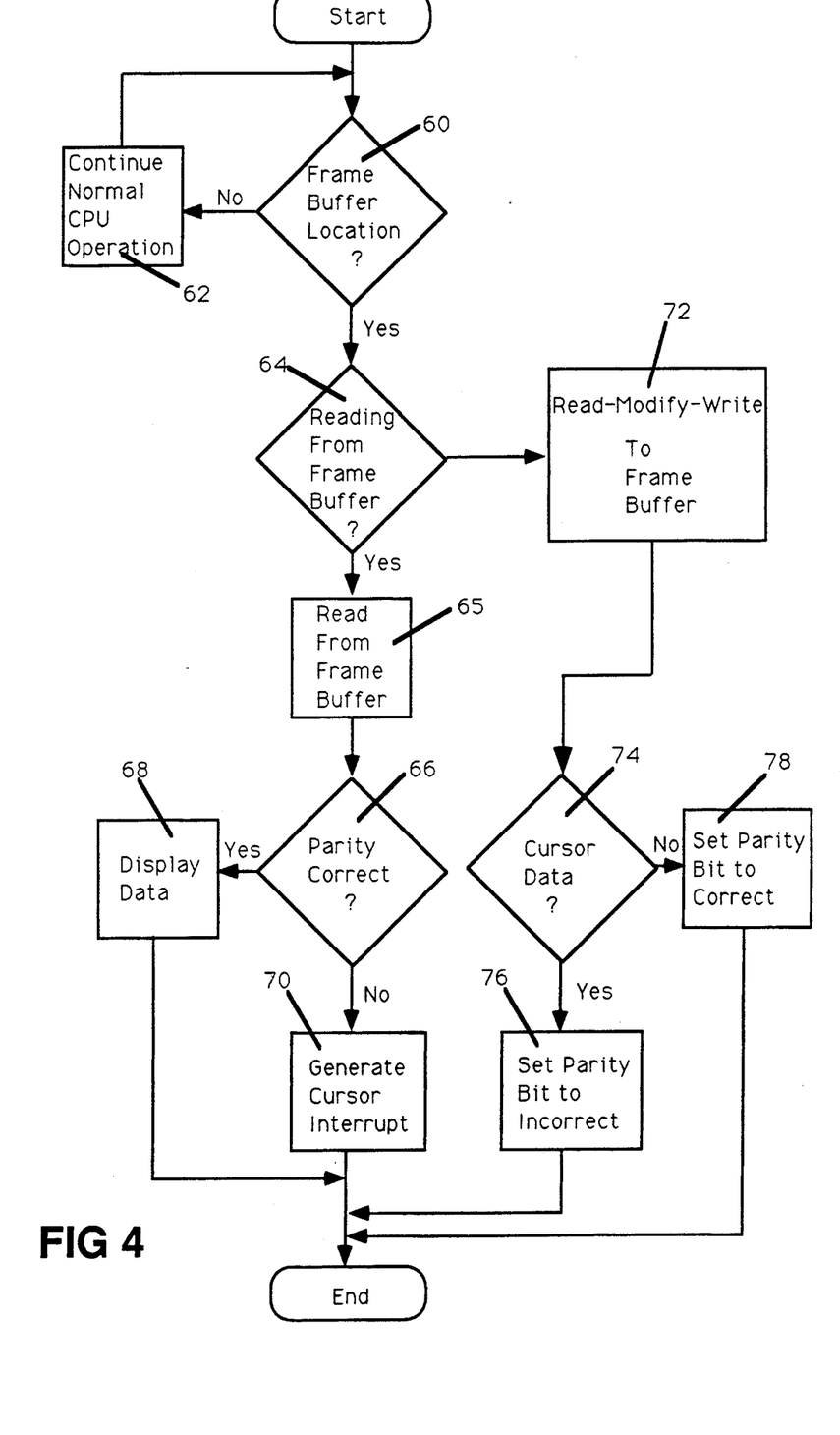
FIG. 4 is a flow chart illustrating the operation of a frame buffer with a graphic display system in accordance with the present invention.

FIG. 4 is a flow chart that illustrates the sequence of operations of the present invention to substantially reduce the CPU time required to manipulate the cursor without affecting system performance. Using the parity bit as indicia for cursor position not only improves the overall system performance, but it permits the simultaneous display and manipulation of multiple cursors on the same video display screen. In a system that is in accordance with the present invention, an error interrupt would not be generated unless the display port 32 is reading from a data location containing cursor data. According to step 60 in the flow chart of FIG. 4, normal CPU operation in step 62—including parity check—continues until there is a reference to the main computer memory containing the frame buffer. To distinguish references to the frame buffer from those to the rest of the main computer memory, designers would use base-bounds registers or high-order address bit decoding, among a host of other means.

In step 64 of FIG. 4, the system determines whether the reference to the frame buffer is a read or write operation. Steps 65, 66, 68, 70 illustrates the system operations if the reference is a read operation. Step 66 is a parity check to determine if data location 22 contains image data (parity bit set to correct), and is followed by step 68, where the image data is read and displayed on the video display 34. On the other hand, if the parity check detects that display port 32 is reading cursor data (parity bit set to incorrect) from data location 22 in step 66, memory controller 12 generates an error interrupt as shown in step 70. The error interrupt in step 70 requires the system to check whether the parity error was due to a real parity error, or a cursor reference. If the error is real, then the data location is rewritten with the correct data; otherwise, the original cursor data will be restored.

Referring again to step 64 of FIG. 4, the system determines whether the reference to the frame buffer is a read or write operation. Steps 72, 74, 76, 78 illustrate the system operations if the reference is a write operation. Step 72 illustrates the write operation is modified to execute as a read-modify-write cycle. A read-modify-write cycle allows the memory controller to update the frame buffer by reading a group of pixels, compute new values, and write the pixels back into the frame buffer. As such, the parity bit 24 can be checked before writing new data, and thus it is possible to determine whether or not memory location 22 containing cursor data is being overwritten. It will be appreciated that a read-modify-write cycle can update the memory faster than separate read and write cycles.

Steps 74, 76, 78 illustrate how the system sets the parity bit. In step 74, the system determines whether the data is image data or cursor data. If the data is image data, the memory controller is modified to always set the parity bit to correct. On the other hand, if the data is cursor data, the memory controller is modified to always set the parity bit to incorrect.

The advantages of the invention will be apparent to those skilled in the art. By coupling the parity checking scheme of the present invention with a read-modify-write cycle, users not only detect multiple writes to cursors without additional hardware or software, but also receive immediate feedback on attempts to overwrite existing cursor data. Because the task of manipulating multiple cursors on the video display is integrated with the error detection operation of the main computer memory, the CPU is free to process other high priority tasks of the graphic display system.

Figure 5A:
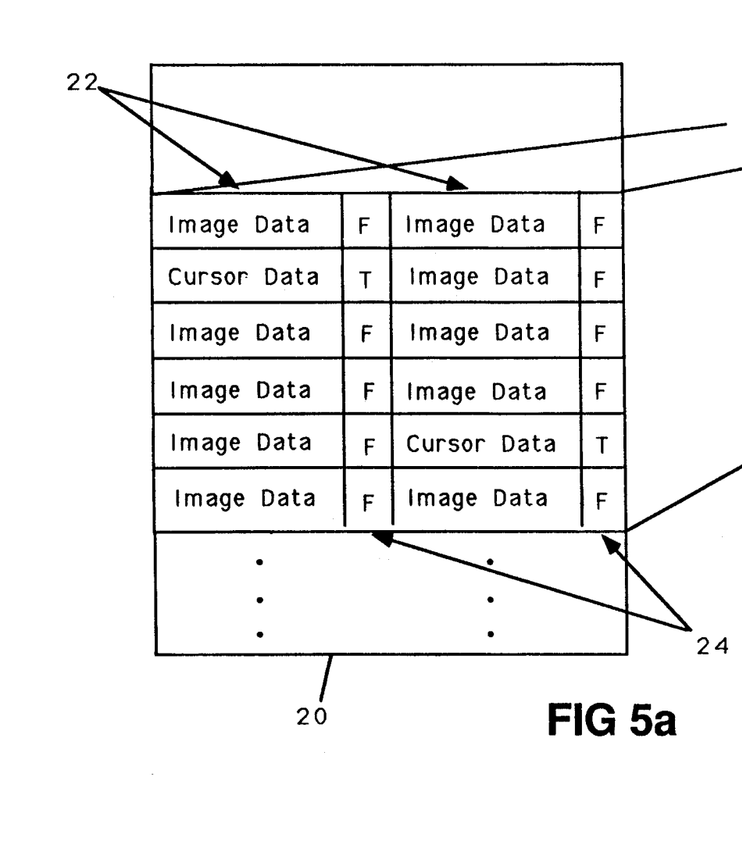
FIGS. 5a and 5b illustrate the data structure of a more sophisticated frame buffer in accordance with the present invention.
Figure 5B:
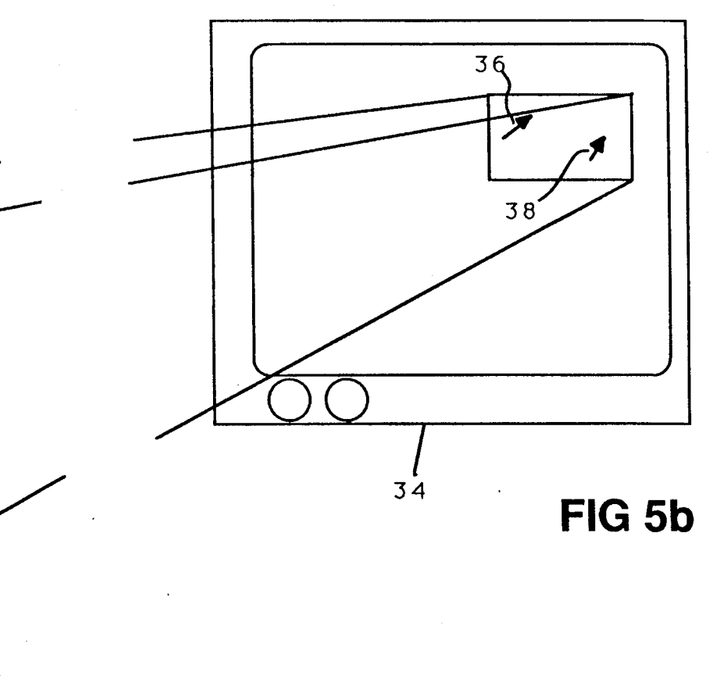
Figure 6:
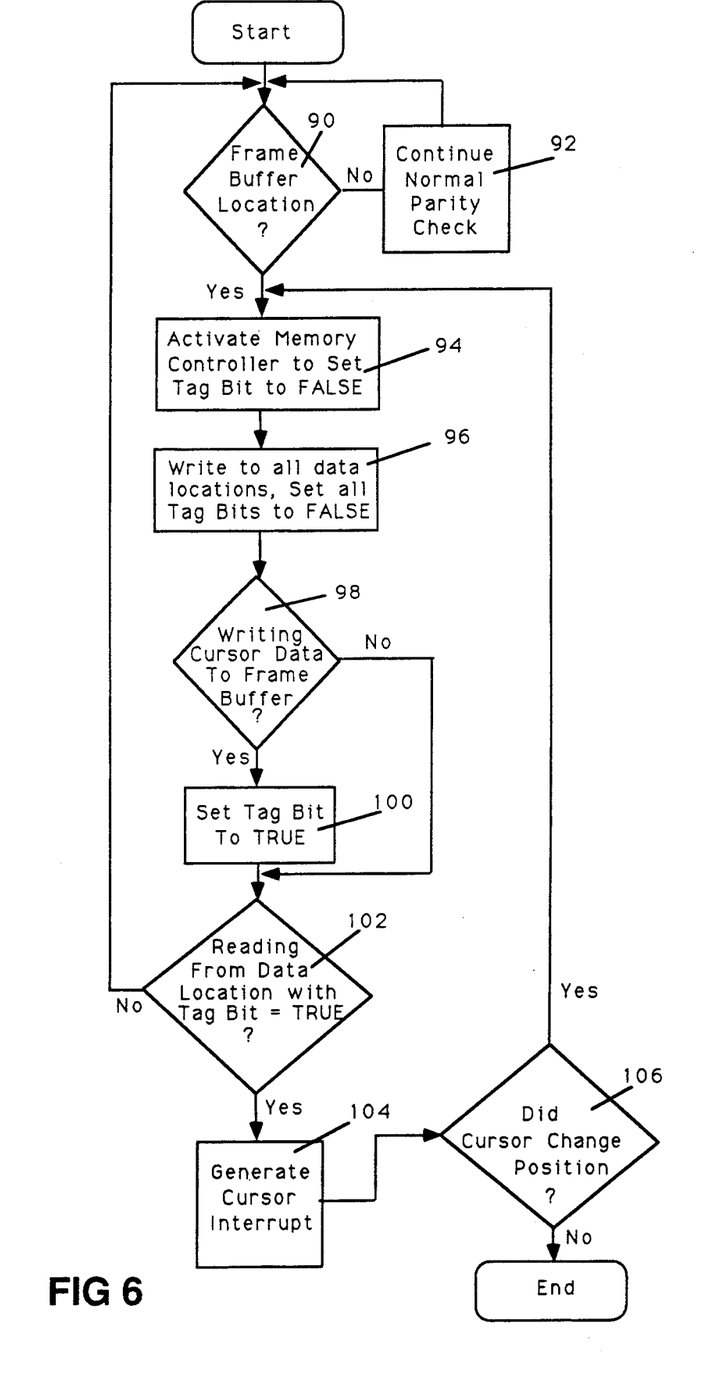
FIG. 6 is a flow chart illustrating the operating of a more sophisticated frame buffer in a graphic display system in accordance with the present invention.

A second embodiment of the invention is illustrated in the data structure of FIGS. 5a and 5b and the flow chart of FIG. 6. The parity bit of each data location of the frame buffer is no longer used for error detection, and the memory controller does not write the parity bit as part of the normal frame buffer write. Instead, the parity bit is used as a "tag" bit. In other words, the memory controller has a mode that forces the state of the parity bit to either TRUE or FALSE, independent of the contents of the data location. As such, the memory controller generates an interrupt whenever a reference is made to a data location that has a parity bit set a certain way, independent of the contents of the data location. Unlike the first embodiment of the present invention, the second embodiment does not write to the frame buffer as a read-modify-write cycle. Since the state of the parity bit is independent of the contents of the data location, the memory controller can read the state of the parity bit while writing to the data location associated with the parity bit.

In FIGS. 5a and 5b, a bitmap and data structure similar to that in FIGS. 3a and 3b is shown. The parity bit field 24 is used as tag bits. Accordingly, memory controller 12 initializes the state of tag bits to True (parity bit set to "T") for each data location containing cursor data. Otherwise, memory controller initializes the state of tag bits to False (parity bit set to "F"). Thereafter, the memory controller tracks the location and movement of cursors by referring to the parity bit field 24 rather than the data location field 22.

Referring to FIG. 6, in step 90 the normal CPU operation of parity checking continues in step 92, until reference is made to main computer memory 16 that contains the frame buffer 20. It will be appreciated that either base-bounds registers, high-order address bit decoding, or similar detection techniques can be used to distinguish between references to the frame buffer 20 and those to the rest of main computer memory 16. According to step 94, any reference to frame buffer 20 initializes memory controller 12, which always sets the parity bit 24 to FALSE. Memory controller 12 proceeds to write data, including image data and cursor data, to all data locations 22 in frame buffer 20, as illustrated in step 96. Upon completion of writing data, memory controller 12 sets parity bit 24 to TRUE for each data location that contains cursor data in step 98. If a data location contains image data, memory controller 12 leaves the parity bit the way it is. This concludes the initialization of the memory controller. Thereafter, whenever there is a read or write reference to a data location in the frame buffer that contains a TRUE parity bit, the memory controller generates an interrupt as illustrated in step 104.

Should user move any of the cursors, steps 94, 96, 98, 100, 102, 104 are re-executed. In the second embodiment of the present invention, because the memory controller can set the parity bit independently of the contents of the data location in the frame buffer, step 96 needs to rewrite only those locations occupied by the cursors, and not the entire frame buffer. At the same time, step 100 needs only to write the cursors in their new location.

While the present invention has been described in conjunction with the preferred embodiments in FIGS. 1-6 and with emphasis on certain computer memory configuration, it should be understood that the figures are for illustration only and should not be taken as limitation upon the invention. In addition, it is clear that the method and apparatus of the present inventions has utility in any graphic display system where cursor control devices are used. In particular, error correction codes other than parity checking scheme or tag bits, may be used to implement the present invention. Similarly, a variety of means of detecting reference to the computer memory may be used. It is contemplated that many changes and modifications may be made, by one of ordinary skill in the art, without departing from the spirit and scope of the invention as disclosed.

I claim:

1. An apparatus for detecting and controlling the position of at least one cursor in a computer display system having a display, comprising a plurality of display elements, and a processor unit, said apparatus comprising:

memory means coupled to said processor unit for storing data in an address field and a parity field, said address field having a plurality of address locations, each of said address locations comprising a display address identifying the location of a display element on said display, said parity field having a plurality of parity locations, each of said parity locations storing a parity bit associated with a particular address location;

cursor control means coupled to said processor unit for moving the position of said cursor on said display;

memory control means coupled to said processor unit for writing data into said memory means;

memory reading means coupled to memory means for reading the contents of said memory means; and cursor detection means for modifying a parity bit if the position of said cursor coincides with the position of the associated address location.

2. The system as defined in claim 1, wherein said memory means further comprises a part of a main computer memory.

3. The system as defined in claim 1, wherein said memory means further comprises a separate memory, said separate memory being coupled to a graphics processor unit, said graphics processor unit being coupled to a processor unit.

4. The system as defined in claim 1, wherein said cursor detection means modifies said parity bit to a first predetermined value indicative of a true state when said associated address location contains image data, said cursor detection means modifies said bit to a second predetermined value indicative of a false state when said associated address location contains cursor data.

5. The system as defined in claim 4, wherein said memory control means writes data to said memory means on a read-modify-write cycle.

6. The system as defined in claim 5, wherein said memory control means generates an interrupt upon detecting an incorrect parity bit, said interrupt restores the cursor if said associated address location contains cursor data, said interrupt rewrites the contents of said associated address location if said associated address location contains incorrect image data.

7. The system as defined in claim 1, wherein said cursor detection means determines the location of a plurality of cursors.

8. The system as defined in claim 1, wherein said memory control means writes data into said memory means while updating the contents of said parity field.

9. The system as defined in claim 8, wherein said memory control means initialized said parity field by writing FALSE into all parity locations, said memory control means reset the parity bit to TRUE upon writing cursor data into memory means.

10. The system as defined in claim 9, wherein said memory control means generates an interrupt upon detecting a TRUE bit, said interrupt restores said cursor data if said address location contains cursor data, said interrupt rewrites the contents of said address location containing incorrect data.

11. The system as defined in claim 10, wherein said cursor detection means determines the location of a plurality of cursors.

12. A method of determining the location of a cursor in a computer display system including a display and a processor unit, comprising the steps of:

storing data in a memory means coupled to said processor unit, said memory means including an address field and a parity field, said address field having a plurality of address locations, each of said address locations comprising a display address identifying the location of a display element on said display, said parity field having a plurality of parity locations, each of said parity locations storing a parity bit associated with a particular address location of each of said parity bits reporting the contents of said particular address location;

moving the position of said cursor on said display by a cursor control means coupled to said processor unit;

writing data into said memory with a memory control means coupled to said processor unit;

reading the contents of said memory means with a memory reading means coupled to said memory means;

modifying said parity bits with cursor detection means if the position of said cursor coincides with the position of said address location.

13. The method as defined in claim 12, wherein said memory means further comprises a part of a main computer memory.

14. The method as defined in claim 13, wherein said memory means further comprises a separate memory, said separate memory being coupled to a graphics processor unit, said graphics processor unit being coupled to a processor unit.

15. The method as defined in claim 13, wherein said cursor detection means modifying said parity bit to a first predetermined value indicative of a true state when said associated address location contains image data, said cursor detection means modifying said parity bit to a second predetermined value indicative of a false state when said associated address location contains cursor data.

16. The method as defined in claim 15, wherein said memory control means writes data into said memory means on a read-modify-write cycle.

17. The method as defined in claim 12, wherein said memory control means generates an interrupt upon detecting an incorrect parity bit, said interrupt restores the cursor if said associated address location contains cursor data, said interrupt rewrites the contents of said associated address location if said associated address location contains incorrect image data.

18. The method as defined in claim 12, wherein said cursor detection means determines the location of a plurality of cursors.

19. The method as defined in claim 12, wherein said memory control means writes data into said memory means while updating the contents of said parity bit field.

20. The method as defined in claim 19, wherein said memory control means initializes said parity bit field by writing FALSE into all parity locations, said memory control means sets parity bit to TRUE upon writing cursor data into memory means.

21. The method as defined in claim 20, wherein said memory control means generates an interrupt upon detecting a TRUE bit, said interrupt restores said cursor data if said address location contains cursor data, said interrupt rewrites the contents of said address location containing incorrect data.

22. The method as defined in claim 21, wherein said cursor detection means determines the location of a plurality of cursors.

23. An apparatus for detecting and controlling the position of at least one cursor in a computer display system having a display, comprising a plurality of display elements and a processor unit, said apparatus comprising:
- memory means coupled to said processor unit for storing data in an address field and a parity field, said address field having a plurality of address locations, each of said address locations comprising a display address identifying the location of a display element on said display, said parity field having a plurality of parity locations, each of said parity locations storing a parity bit associated with a particular address location;
- cursor control means coupled to said processor unit for moving the position of said cursor on said display;
- cursor detection means for modifying a parity bit if the position of said cursor coincides with the position of the associated address location.
- memory reading means coupled to memory means for reading the contents of said memory means;
- memory control means coupled to said processor unit for writing data into said memory means, said memory control means generates a parity error to cause an interrupt upon detecting an incorrect parity bit whereby the interrupt prevents overwrite of the cursor;

24. The system as defined in claim 23, wherein said memory means further comprises a part of a main computer memory.

25. The system as defined in claim 23, wherein said memory means further comprises a separate memory, said separate memory being coupled to a graphics processor unit, said graphics processor unit being coupled to a processor unit.

26. The system as defined in claim 23, wherein said cursor detection means modifies said parity bit to a first predetermined value indicative of a true state when said associated address location contains image data, said cursor detection means modifies said bit to a second predetermined value indicative of a false state when said associated address location contains cursor data.

27. The system as defined in claim 26, wherein said memory control means writes data to said memory means on a read-modify-write cycle.

28. The system as defined in claim 27, wherein said memory control means generates an interrupt upon detecting an incorrect parity bit, said interrupt restores the cursor if said associated address location contains cursor data.

29. The system as defined in claim 23, wherein said cursor detection means determines the location of a plurality of cursors.

30. The system as defined in claim 23, wherein said memory control means writes data into said memory means while updating the contents of said parity field.

31. The system as defined in claim 30, wherein said memory control means initialized said parity field by writing FALSE into all parity locations, said memory control means resets the parity bit to TRUE upon writing cursor data into memory means.

32. The system as defined in claim 31, wherein said memory control means generates an interrupt upon detecting a TRUE bit, said interrupt restores said cursor data if said address location contains cursor data, said interrupt rewrites the contents of said address location containing incorrect data.

33. The system as defined in claim 32, wherein said cursor detection means determines the location of a plurality of cursors.

34. An apparatus for detecting and controlling the position of at least one cursor in a computer display system having a display, comprising a plurality of display elements, and a processor unit, said apparatus comprising:
- memory means coupled to said processor unit for storing data in an address field and a parity field, said address field having a plurality of address locations, each of said address locations comprising a display address identifying the location of a display element on said display, said parity field having a plurality of parity locations, each of said parity locations storing a parity bit associated with a particular address location;
- cursor control means coupled to said processor unit for moving the position of said cursor on said display;
- memory control means coupled to said processor unit for writing data into said memory means;
- memory reading means coupled to memory means for reading the contents of said memory means;
- cursor detection means for modifying a parity bit if the position of said cursor coincides with the position of the associated address location, said cursor detection means modifies said parity bit to a first predetermined value indicative of a true state when said associated address location contains image data, said cursor detection means modifies said bit to a second predetermined value indicative of a false state when said associated address location contains cursor data;
- parity reading means for detecting said parity bit; and
- interrupt generating means for generating an interrupt, said interrupt being generated when updating the display and the second predetermined value indicative of a false state is detected by said parity reading means whereby overwrite of the cursor is prevented.

35. The system as defined in claim 34, wherein said memory means further comprises a part of a main computer memory.

36. The system as defined in claim 34, wherein said memory means further comprises a separate memory, said separate memory being coupled to a graphics processor unit, said graphics processor unit being coupled to a processor unit.

37. The system as defined in claim 34, wherein said memory control means writes data to said memory means on a read-modify-write cycle.

38. The system as defined in claim 37, wherein said memory control means generates an interrupt upon detecting an incorrect parity bit, said interrupt restores the cursor if said associated address location contains cursor data, said interrupt rewrites the contents of said associated address location if said associated address location contains incorrect image data.

39. The system as defined in claim 34, wherein said cursor detection means determines the location of a plurality of cursors.

40. The system as defined in claim 34, wherein said memory control means writes data into said memory means while updating the contents of said parity field.

41. The system as defined in claim 40, wherein said memory control means initialized said parity field by writing FALSE into all parity locations, said memory control means resets the parity bit to TRUE upon writing cursor data into memory means.

42. The system as defined in claim 41, wherein said memory control means generates an interrupt upon detecting a TRUE bit, said interrupt restores said cursor data if said address location contains cursor data, said interrupt rewrites the contents of said address location containing incorrect data.

43. The system as defined in claim 42, wherein said cursor detection means determines the location of a plurality of cursors.

44. The system as defined in claim 34 wherein said memory control means generates a parity error to cause an interrupt upon detection of incorrect image data.

* * * * *

UNITED STATES PATENT AND TRADEMARK OFFICE
CERTIFICATE OF CORRECTION

PATENT NO. : 5,107,251
DATED : April 21, 1992
INVENTOR(S) : Frank et al.

It is certified that error appears in the above-identified patent and that said Letters Patent is hereby corrected as shown below:

In column 9, claim 19 at line 1, please delete "bit".

Signed and Sealed this

Eleventh Day of November, 1997

Attest:

BRUCE LEHMAN

Attesting Officer

Commissioner of Patents and Trademarks